United States Patent [19]
Spiers et al.

[11] 4,047,421
[45] Sept. 13, 1977

[54] APPARATUS FOR CALIBRATING CIGARETTE INSPECTION DEVICE

[75] Inventors: Steven F. Spiers; Howard M. Lewis; Gerald A. Kraft; Arthur R. Pasquine, all of Richmond, Va.

[73] Assignee: Philip Morris Incorporated, New York, N.Y.

[21] Appl. No.: 711,572

[22] Filed: Aug. 4, 1976

[51] Int. Cl.² .............................................. G01M 3/26
[52] U.S. Cl. .......................................... 73/1 R; 73/45
[58] Field of Search .................. 73/1 R, 41, 45, 45.1, 73/45.2

[56] References Cited
U.S. PATENT DOCUMENTS 3,608,380  9/1971  Mvir et al. ............................ 73/45.1

Primary Examiner—S. Clement Swisher
Attorney, Agent, or Firm—Cameron, Kerkam, Sutton, Stowell & Stowell

[57] ABSTRACT

Apparatus is disclosed for calibrating a cigarette inspection device, whereby known defects, such as perforations, are placed in the wrappings of certain cigarettes as they pass through the cigarette inspection device, including a test drum for receiving the cigarettes to be inspected and associated with a pressure-responsive device to be connected successively to the interior of each cigarette at a test point, as it is moved about upon the periphery of the drum past the test point. In operation, a calibration control circuit is actuated to place a defect, in the form of a perforation, into three test cigarettes. Defects, of a magnitude greater than the acceptable limit, are placed in the first and third test cigarettes, and a defect within the acceptable limit is placed in the second test cigarette. The calibration control circuit is connected to the pressure-responsive device to measure the internal pressure within the test cigarette and the calibration control circuit may be adjusted to provide a manifestation that the first and third test cigarettes are defective and that the second cigarette is acceptable, whereby cigarettes to be subsequently tested are tested with regard to a pressure measurement that has been calibrated with respect to known, acceptable and unacceptable defects within the test cigarettes.

11 Claims, 7 Drawing Figures

APPARATUS FOR CALIBRATING CIGARETTE INSPECTION DEVICE

BACKGROUND OF THE INVENTION

1. Field of the Invention

This invention relates to the testing of cigarettes and similar rod-like articles, having an air-pervious filling and an open-ended wrapping for the filling, for leaks in the wrapping.

2. Description of the Prior Art

In the case of cigarettes, such leaks can render them impossible or very unsatisfying to smoke. For very many years, it has been the practice in the cigarette-manufacturing industry for each of the cigarettes coming off a cigarette-making machine to be inspected by an operator. With modern speeds of production of cigarettes, which are at the rate of several thousand per minute, it becomes desirable to replace this manual inspection with an automatic testing apparatus which will receive a continuous high speed stream of cigarettes from a cigarette maker, test them, reject those that are unsatisfactory and pass the good ones on to be conveyed to packing machinery. In recent times, various proposals for the construction of such apparatus have been made.

In U.S. Pat. No. 3,608,380, there is disclosed a construction of apparatus in which a pressure difference is established across the cigarette wrapping by applying suction outside the cigarette, the pressure within the cigarettes being measured to indicate any leaks. This is done by forming an individual testing chamber around each cigarette and applying suction to that chamber. When the measured pressure at the end of the cigarette, relative to atmospheric pressure, exceeds a preset level a reject signal is generated, whereby the faulty cigarette is suitably rejected. In particular, a jet air producing means including a tube and an actuatable valve is disposed adjacent a reject point on a separate fluted drum downstream of the test point, whereby the faulty cigarette is suitably rejected. In particular, a jet air producing means including a tube and an actuatable valve is disposed adjacent a reject point on a separate fluted drum downstream of the test point, whereby the faulty cigarette, when it is moved to the reject point, is rejected by opening the valve to permit the air jet to discharge the cigarette from the drum. However, no means is described in the above-noted U.S. Pat. No. 3,608,380 for accurately and conveniently calibrating the inspection device so that it will reject cigarettes with defects in the cigarette wrapper greater than an acceptable size.

In actual use of cigarette inspection devices or apparatus as described in the above identified U.S. patent, there have been developed several methods whereby such testing apparatus may be empirically, but somewhat inaccurately calibrated. First, the test operator may conduct an efficiency test drilling a hole, typically in the order of 1/16 inch in a bobbin of cigarette paper, before it is wrapped about the tobacco core, and subsequently making cigarettes with this bobbin of paper. While such cigarettes are being tested, the sensitivity control of the inspection device is varied until a certain percentage of the cigarettes made with the 1/16 inch diameter hole are rejected. In the alternative, the test operator may vary the sensitivity control until a certain number of good cigarettes are rejected over a unit time interval, which, from experience with other cigarette inspection apparatus, would be the proper setting. However, there is no known prior means for setting the calibration of such test apparatus with respect to known defects within the cigarette such that the cigarette inspection device will not reject cigarettes that are otherwise acceptable or that the critical level has been set precisely between known defect limits that are readily ascertained to be unacceptable and acceptable.

the inability to accurately and conveniently calibrate such cigarette inspection apparatus leads to the rejection of cigarettes that would otherwise be acceptable. For example, when the manufacturing operation is interrupted upon exhaustion of the supply of the paper wrapping, a new bobbin of cigarette paper wrapping is installed and thereafter the cigarette manufacturing is recommenced. However, the porosity of cigaratte wrapping paper does vary from bobbin to bobbin, and unless the sensitivity of the test circuit is readjusted for the new wrapping paper, cigarettes may be rejected that otherwise would be acceptable, or cigarettes with defects that normally would be rejected may be deemed acceptable by the test apparatus.

SUMMARY OF THE INVENTION

It is an object of this invention to provide improvements in the testing of cigarettes and similar rod-like articles.

It is a more particular object of this invention to provide improved testing of the cigarettes and in particular, defects within its wrapping paper, whereby defects above a critical level may be detected with certainty.

It is a still further object of this invention to provide new and improved calibration apparatus for setting against known standards the test level above which cigarettes with defects are rejected and below which cigarettes that are acceptable will be, in fact, accepted.

In accordance with these and other objects of the present invention, there is provided apparatus for calibrating cigarette inspection apparatus or devices, wherein defects in the form of perforations of known magnitude are disposed in test cigarettes and the test cigarettes are subsequently tested by the cigarette inspection apparatus, while an adjustment procedure is made thereon to calibrate or set the critical level so that the test apparatus will, in fact, reject that cigarette with the known defect and will accept that cigarette that is known to be acceptable.

In a preferred embodiment of this invention, perforating apparatus is disposed upon a test drum, which includes means for establishing an air pressure within the cigarette at a test point or station, different from atmospheric pressure, and for measuring the pressure at the end of the cigarette, relative to atmospheric pressure, by a pressure responsive device. In the calibration procedure, the perforating apparatus is actuated, whereby a perforation is disposed in a first and third test cigarette of a known diameter, larger than the critical level, such that the pressure at the end of the cigarette wrapper, relative to atmospheric pressure, of the first and third test cigarette is established to be greater than the critical limit of acceptable relative pressure and a perforation is disposed in a second test cigarette of a dimension such that the relative pressure is less than the critical level, indicating that the second test cigarette should be accepted by the test apparatus. The perforating apparatus is provided with display means for providing a manifestation corresponding to the relative pressure measurements through the first, second, and third test cigarettes to indicate whether the cigarette inspection apparatus indicates such cigarettes to be unacceptable or acceptable. A sensitivity control is disposed within the cigarette inspection apparatus and is adjusted until a display is provided with respect to the test cigarettes that the first and third test cigarettes are defective or unacceptable and that the second test cigarette is acceptable.

In one illustrative embodiment of this invention, light-emitting means in the form of light-emitting diodes are provided corresponding to each of the test cigarettes and are energized in response to the detection of a defective condition in the test cigarettes such that if the cigarette inspection apparatus is properly calibrated, i.e., the lights associated with the first and third test cigarettes will be actuated and that associated with the second test cigarette will not be actuated.

BRIEF DESCRIPTION OF THE DRAWINGS

These and other objects and advantages of the present invention will become more apparent by referring to the following detailed description and accompanying drawings, in which.

BRIEF DESCRIPTION OF THE PREFERRED EMBODIMENTS

Figure 1:
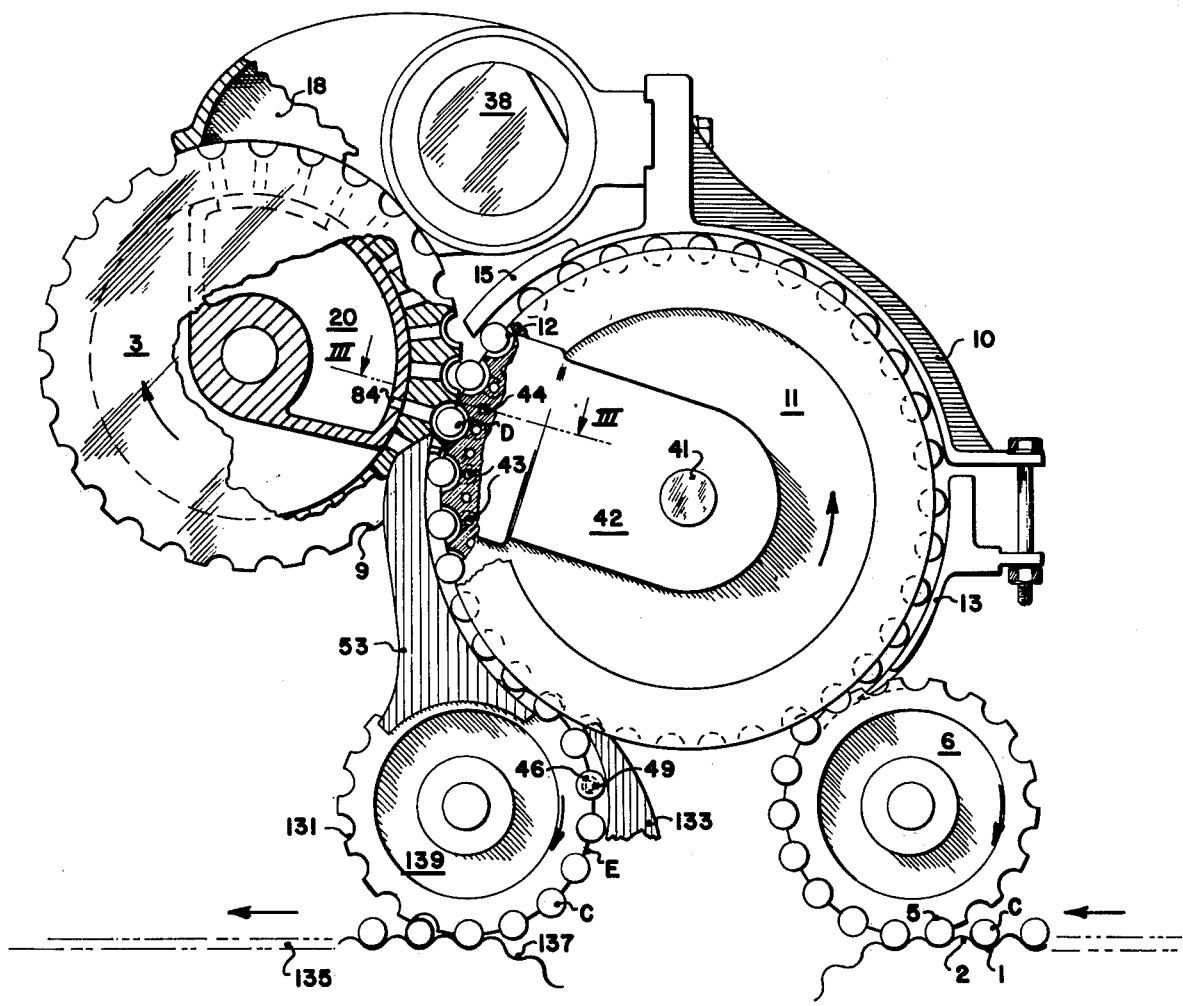
FIG. 1 is an elevation view of apparatus for testing the wrappings of cigarettes and is similar to FIG. 5 of U.S. Pat. No. 3,608,380.

Referring to the drawings and initially to FIG. 1, there is shown a cigarette testing apparatus similar to that described in U.S. Pat. No. 3,608,380, wherein mouthpiece cigarettes C are conveyed transversly of their axes in succession in flutes 1 on a chain conveyor 2 which travels in the direction shown by the arrow.

The cigarettes C are received from the conveyor 1 in flutes 5 on a clockwise (as viewed in FIG. 1) rotating suction drum 6 having an internal suction chamber which communicates with the flutes 5 around that part of the drum's periphery where cigarettes are carried in the flutes.

The cigarettes C retained in flutes 5 of drum 6 by suction are transferred therefrom to an endless conveyor in the form of a test drum 11, having cradles or flutes 12 to receive the cigarettes and convey them transversely to their axes in an anticlockwise direction (as viewed in FIG. 1). Just before the point of transfer from drum 6 to drum 11, suction is cut off from the flutes 5 (by termination of the suction from the internal suction chamber) and the transfer is assisted by stripper elements 13 which extend into the annular grooves on the drum 6. As the cigarettes travel on drum 11, they are held in flutes 12 by the stripper elements 13 and guides 10 and 15.

The machine shown in FIG. 1 comprises a test drum 11 and a closure drum 3 which are preferably of the same diameter (and accordingly rotate at the same speed) and which are fluted to accommodate cigarettes. At test point D, successive flutes of one register with those of the other to define at the testing point a succession of test chambers for the cigarettes. Suction for testing is applied from a suction chamber 20 in the drum 3, being supplied by a chamber 18 and a hollow shaft 38 which communicates with a fan, thru a narrow slot 84 in the suction chamber 20, more precisely explained in U.S. Pat. No. 3,608,380.

Figure 2:
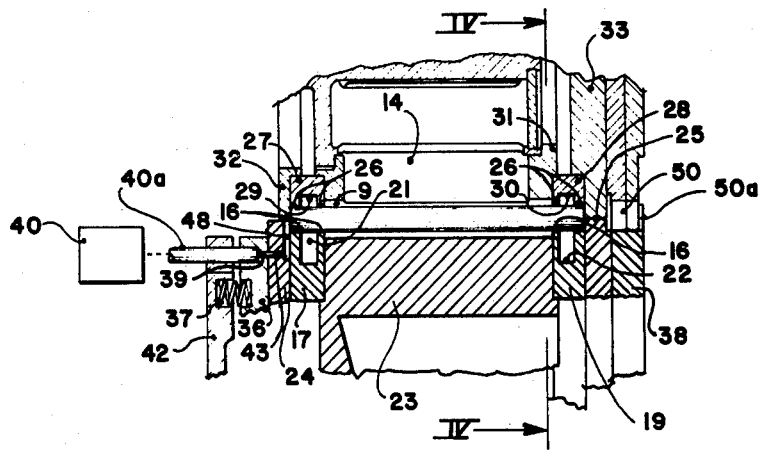
FIG. 2 is a partial, sectioned view of the cigarette inspection apparatus as shown in FIG. 1 and is similar to FIG. 2 of U.S. Pat. No. 3,608,380.

The construction of the flutes of each of the two drums 11 and 3 is shown in FIG. 2. In each drum, there are two axially-spaced sealing ribs at each end of each flute. In the drum 11, the ribs, indicated by the reference 16, are defined by the escalloped edges of two rings 17 and 19 with circumferential grooves 21 and 22 which are open to atmosphere. Between the rings 17 and 19, in the neighborhood of the cigarettes, there is a centre portion 23 of the drum which is formed in its outer periphery with grooves shaped to conform with the cigarettes but with clearence so as to define an approximately half annular space with each cigarette.

The closure drum 3 is formed with flutes which complete the suction chamber around each cigarette at the testing point D. In this case, there are semi-circular sealing ribs 26 which are defined by the escalloped edges of rings 27 and 28 each of which has a circumferential groove, 29 and 30 respectively, between the ribs 26. In the testing position, these grooves 29 and 30 communicate with the grooves 21 and 22 respectively to define around the end of each cigarette an air ring at atmospheric pressure. Between the rings 27 and 28, the closure drum has a centre portion 31 which is formed with the radial passages 14, and in its outer periphery with the flutes 9 into which the passages 14 open. End pieces 32 and 33, which form part of the closure drum, roll on the rings 24 and 25 of the test drum 11. The closure drum is kept in rolling contact with the test drum by gravity.

The cigarette-facing periphery 34 of each rib 16 or 26 is semi-circular (see FIG. 6) and they are all of the same size which is chosen according to the size of the cigarettes. The peripheral faces 35 of the rings 17 and 19 and rings 27 and 28 in the regions between the flutes are curved about the centres of the respective drums so as to be in rolling contact. The radius of the peripheries 34 of the ribs 16 and 26 is chosen so as to leave a gap around the largest possible cigarettes of a certain nominal size, having regard to the tolerance on the diameter of the cigarettes.

Thus, in the testing position, there is a pair of sealing ribs 16, 26 encircling each end of the cigarette. Between the ribs there are annular spaces 21, 22, 29, or 30 which are substantially at atmospheric pressure and which isolate the annular suction chamber around the cigarette from the spaces at the ends of the cigarette, so as to prevent direct leak of suction, except through the cigarette wrapping.

Means are provided at the testing position to communicate between an end of the cigarette and a stationary test device (see FIG. 2). These means comprise a sliding valve block 36 which is urged by a spring 37 into engagement with a manifold ring 24 on one end face of the test drum 11 and which has a flow passage 39 connected by a pipe 40a to a testing device in the form of a suction transducer 40 which generates an electrical signal related to the pressure at the end of a cigarette.

Figure 7:
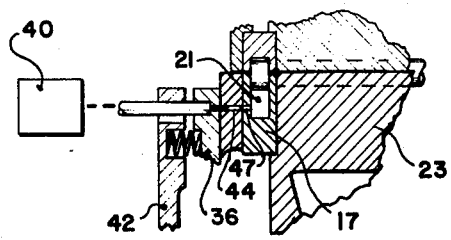
FIG. 7 is a view similar to FIG. 2 on the line III—III in FIG. 1 and is similar to FIG. 3 of U.S. Pat. No. 3,608,380.

The sliding valve block 36 is supported from a shaft 41 (FIG. 1), on which the test drum 11 rotates, by a bracket 42. The manifold ring 24 is formed with transverse passages 43, one for each cigarette, to provide communication successively between the suction transducer and the ends of the cigarettes via passageways 48 (see FIG. 2). Between the passageways 43 there are passageways 44 (see FIG. 1); these communicate with the air space 21 via 41 in ring 17, as shown in FIG. 7, which is a radial section slightly offset from FIG. 2 so as to pass through a passageway 44. By this means, as the test drum 11 rotates, the suction transducer is alternately connected with a cigarette subjected to suction in the testing position, and then with atmosphere.

The suction in the zone around the cigarette at the testing position produces an air flow from atmosphere to the zone via the annular space 21, 29 (FIG. 2), through wedge-shaped leakage passages 35a (see FIG. 6) into a small space at the left-hand end of the cigarette (FIG. 2) communicating with the passage 48, through the interior of the cigarette and radially out through the wrapper of the cigarette. The suction pressure sensed by the transducer 40 via the passage 48 depends upon the air flow through the wrapper of the cigarette since the air flow path from atomosphere to the end space (communicating with the passage 48) comprises the predetermined leakage path through the wedge-shaped openings 35a formed between the ribs 26 and 16 at the testing position. In the event of a cigarette wrapper at the testing position having a hole, the increased air flow which this hole allows produces an increased pressure drop from atmosphere to the end space, and the transducer 40 responds to this increased pressure drop.

The suction transducer generates a current in response to this pressure drop, and if this current exceeds a preset level, the cigarette is rejected in a manner to be described later.

The closure drum 3 is driven to rotate with the test drum 11 by a gear 50 on the closure drum which meshes with a gear 50a on the test drum (see FIG. 2).

The leading end of a guide 53 extends up into the grooves 29 and 30 of the closure drum 3 to insure that none of the cigarettes stick in the flutes 9 after testing (see FIG. 1).

The cigarettes, having been tested as described above, continue their travel on the continuously rotating drum 11, being held in flutes 12 by guide 53. At the termination of guide 53, the cigarettes are transferred from the flutes 12 of drum 11 to the flutes 131 of a suction drum 139, which rotates in a clockwise direction (as viewed in FIG. 1) the transfer being assisted by stripper guides 133 arranged adjacent and to either side of the drum 139. Suction is applied to the flutes 131 from an arcuate suction chamber inside the drum 139. As cigarettes pass point E (FIG. 1), those which the inspection apparatus has determined to be faulty are rejected in a manner to be described later. Cigarettes not so rejected remain in the flutes 131, held by the guides 133 and suction from the internal suction chamber. These cigarettes are then deposited from the drum 131 into the flutes 137 of the chain conveyor 135, suction being cut off (by termination of the suction from the internal suction chamber) from the flutes 131.

Figure 3:
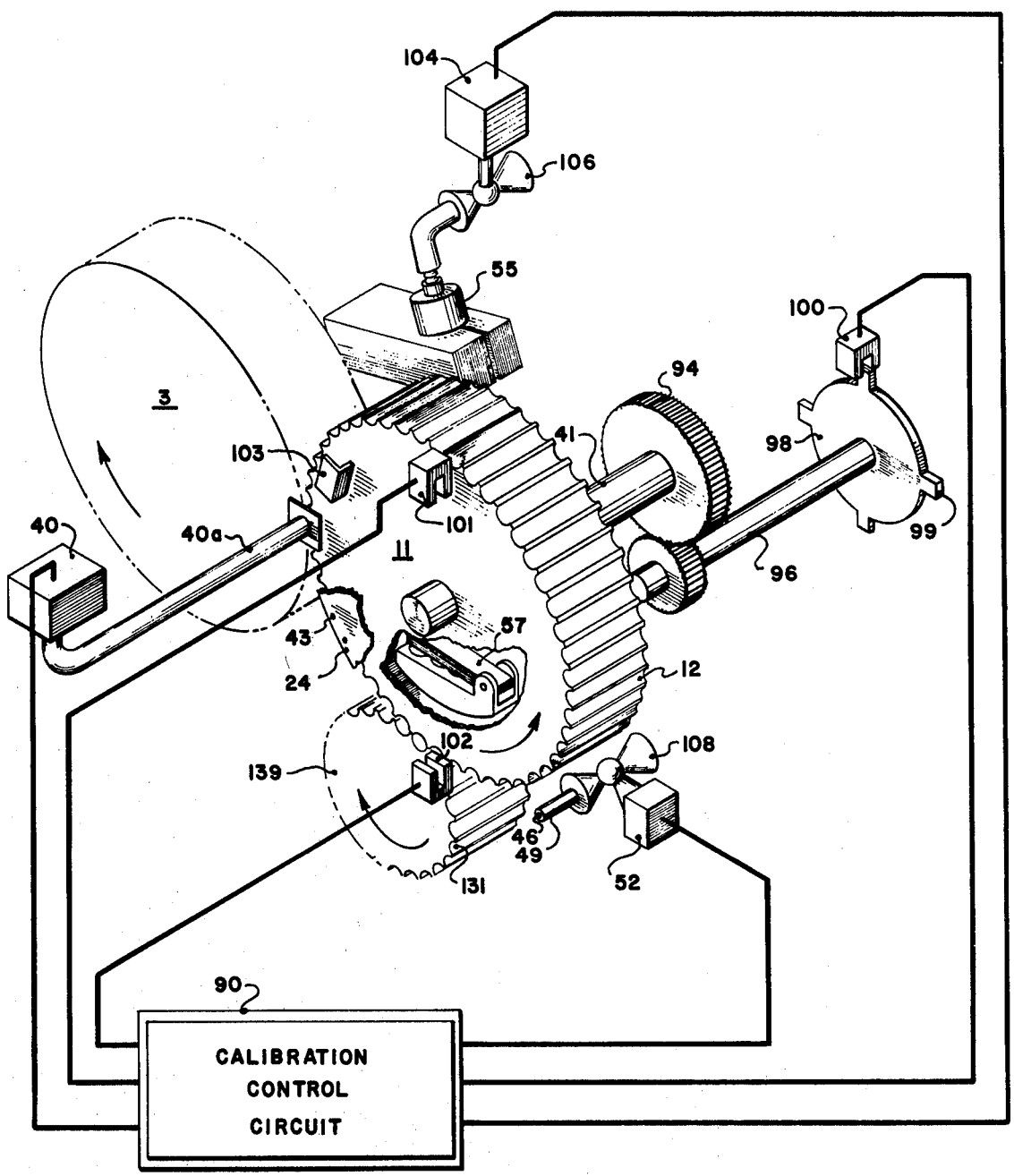
FIG. 3 is a simplified, diagrammatic view of the calibration apparatus in accordance with the teachings of this invention as it is related to the cigarette testing apparatus as shown in FIGS. 1 and 2.

As shown in FIG. 3, the electrical signal output of the suction transducer 40 is applied to a calibration control circuit 90 in accordance with the teachings of this invention. It is noted that the aforementioned cigarette inspection device or apparatus as described hereinbefore with respect to FIGS. 1, 2, 7, and 8 is not, per se, a part of the subject invention, and is described in U.S. Pat. No. 3,608,380. The invention as described more specifically relates to the calibration control circuit 90 and the manner in which it relates to specified elements of the cigarette test apparatus, as now will be described generally with respect to FIG. 3. In particular, the test drum 11 is coupled by an axle 41, a reducing gear mechanism 94 and an axle 96 to a timing disk 98, upon which there are placed four timing tongues 99, disposed at equal spacings of 90° about the periphery of the timing disk 98. The gear reduction mechanism 94 provides a 12 to 1 reduction in the rotation as transferred from the axle 41 to that imparted to axle 96. A pick-off (100), illustratively taking the form of a Honeywell No. 901FSS3.5 Hall-effect generator, is disposed to detect the passing of each of the tongues 99 and to provide, as will be explained in detail later, a clock or timing signal to the calibration control circuit 90. Nothing that in one illustrative embodiment of this invention, 48 cradles or flutes 12 are disposed, equally-spaced, about the periphery of the test drum 11, so that with the given reduction provided by the mechanism 94 and the configuration of the tongues 99 and the timing disk 98, a pick-off provides a clock pulse corresponding to the passage of each of the flutes 12 of the test drum 11.

There is mounted within the test drum 11 perforating apparatus 57, which is actuated under the control of the calibration control circuit 90 to place defects in the form of perforations of known dimension or diameter, into test cigarettes, as will be explained later in detail with respect to FIGS. 4, 5, and 6, a first perforation of a diameter in excess of that which will provide an air flow through the cigarette wrapper of the test cigarette, greater than an acceptable level, and a second perforation of a diameter establishing an air flow less than the acceptable level as detected by the suction transducer 40. After being perforated, the test cigarettes are moved to the test point, as illustrated in FIG. 2, where at, as explained above, the suction transducer 40 provides an electrical signal indicative of the air flow through that cigarette. If the condition of the cigarette is satisfactory, the electrical signal from the suction transducer 40 is below a critical value, whereas if the cigarette is faulty, a high air flow through the wrapping occurs, and a high signal output is generated by the suction transducer 40. As will be explained in detail, these signals are stored in a suitable memory in the form of a shift register, whereby the stored transducer output signals actuate at a moment later in time, a reject solenoid 52 associated with an air valve 108, whereby an air jet is directed along the axis of that flute 131 at the reject point, whereby a cigarette found to be defective is rejected, in a manner to be explained more fully. Further, a timing tongue 103 is disposed upon the periphery of the test drum 11, indicating the position at which the perforations are disposed within the test cigarettes by the perforating apparatus 57. A pick-off 101 is provided similar to that of the pick-off 100, whereby a timing signal is provided by the pick-off 101 indicating that, as the drum 11 rotates, the perforation apparatus 57 is in position to effect perforation of the test cigarettes. Thus, when the operator desires to calibrate the cigarette testing apparatus, the calibration control circuit 90 is initiated and in response to the output of the pick-off 101 thereafter, the calibration control circuit 90 provides an actuating signal to a perforator solenoid 104 which in turn opens for a controlled period of time, an air valve 106, whereby an actuating mechanism 55 associated with the perforator apparatus 57 is actuated and the perforating device 57 in turn is actuated to place the perforations in the test cigarettes.

As indicated above, the calibration control circuit 90 responds to pick-off 102 to actuate the reject solenoid 52, whereby an air jet is provided through pipe 49 (FIGS. 1 and 3). The pipe 49, through which air can be blown, permits an air jet to be directed through the hole 46. Air is blown through the pipe 49 responsively to the operation of the suction transducer 40 and in timed relationship with the operation of the cigarette test apparatus in such a way that when a cigarette which the suction transducer 40 has found to be faulty reaches the position E (FIG. 1), an air jet is directed through the hole 46 against the end face of the cigarette, causing the cigarette to be blown out axially. These rejected cigarettes may be collected and counted if desired.

Figure 4:
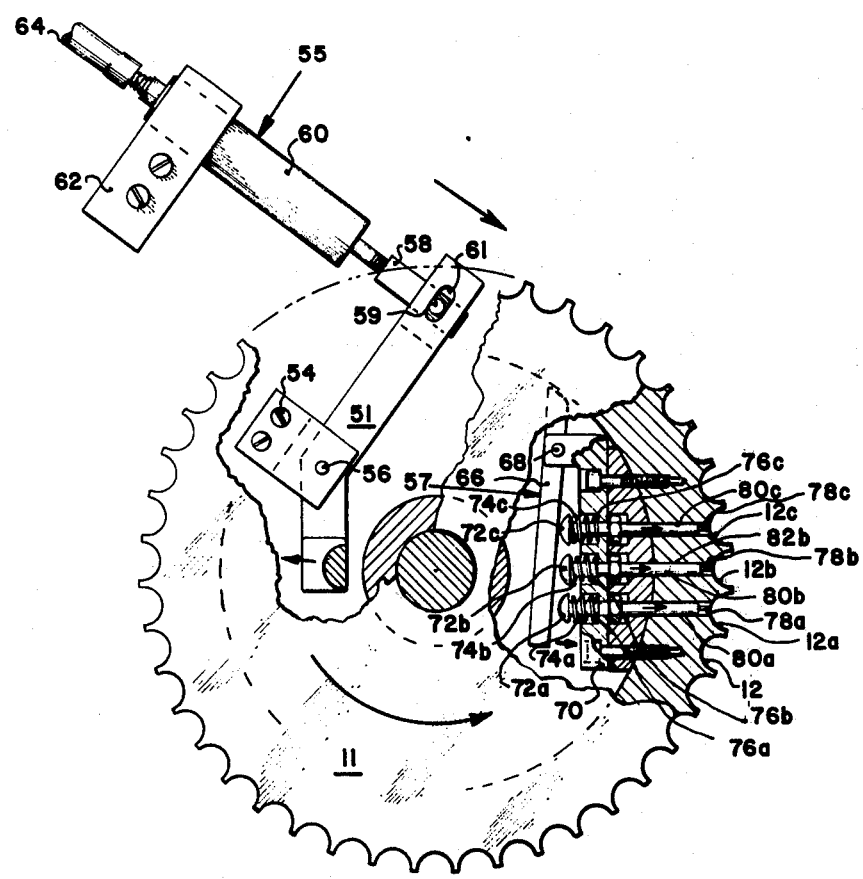
FIG. 4 is a view of Item 23 (FIG. 2) particularly illustrating the perforating apparatus for providing the known perforations or defects in the test cigarettes, and including
a fragmentary view of the actuating mechanism, shown in a cut away portion, whereby the perforating apparatus is actuated.

Referring now to FIG. 4, there is shown in detail the nature of the perforating apparatus 57 and the actuating mechanism 55. First, with respect to FIG. 4, the perforating apparatus 57 includes a support assembly 70 having a plurality of openings 76a, 76b, and 76c for receiving, respectively, perforating pins 80a, 80b, and 80c. Each of the perforating pins 80 includes a rounded cam surface 72 against which a pivotally mounted actuating lever 66 engages, and a shaped end 78 for providing the desired perforation in the test cigarette. In the illustrative embodiment shown in FIG. 4, the perforating pins 80a and 80c are provided with a relatively large diameter in the order of 0.040 inches to provide a corresponding defect or perforation within its test cigarettes considered to be unacceptable, whereas the pin perforator 80b has an end 78b of a diameter of 0.20 inches such that its corresponding test cigarette has an opening or perforation that is considered to be acceptable. The actuating lever 66 is pivotally mounted as by a pin 68 to be rotated under the influence of the actuating mechanism in a counterclockwise direction, as seen in FIG. 4, to press each of the perforating pins 80a, 80b, 80c to the right, as shown in FIG. 4, whereby the test cigarettes disposed within the corresponding flutes 12a, 12b, and 12c are perforated with the corresponding defects or perforations. In the following description, the cigarettes so perforated as disposed in the flutes 12a, 12b and 12c will be designated as first, second, and third test cigarettes. After being directed to the right, as shown in FIG. 4 by the actuating lever 66, the perforating pins 80a, 80b, and 80c are returned to their normal positions by corresponding springs 74a, 74b, and 74c.

As shown in FIG. 4, the perforating apparatus 57 is associated with an actuating mechanism 55. The actuating mechanism 55 includes an air cylinder lever 51 that is pivotally mounted by a pin 56, which in turn is mounted stationary independently of the test drum 11, by a clamp 54. As seen in FIG. 4, the air cylinder lever 51 is rotatable from the position as shown therein, clockwise to a second position by an air cylinder 60 to which air pressure is fed selectively by a tube 64 under the control of the air valve 104, as explained with regard to FIG. 3. The air cylinder 60 includes a piston which is coupled to an air cylinder ram 58, which in turn is coupled by a pin 59 to an opening 61 within the air cylinder lever 51. The air cylinder 60 is also mounted stationary by a clamp 62 independently of the test drum 11. In operation, it is seen that upon energization of the perforator solenoid 104, thus opening the valve 106, the cylinder 60 is energized, whereby the ram 58 is pushed downward as shown in FIG. 4, thereby rotating the air cylinder lever 51 in a clockwise direction. Upon actuation to its second position, the air cylinder lever 51 is disposed to intercept the activating lever 66, as the drum 11 and the perforating apparatus 57 rotates therewith. Upon engagement with the air cylinder lever 51, the actuating lever 66 rotates in a counterclockwise direction as shown in FIG. 4, whereby the perforating pins 80a, 80b, and 80c are disposed to the right to perforate the first, second, and third test cigarettes.

Figure 5:
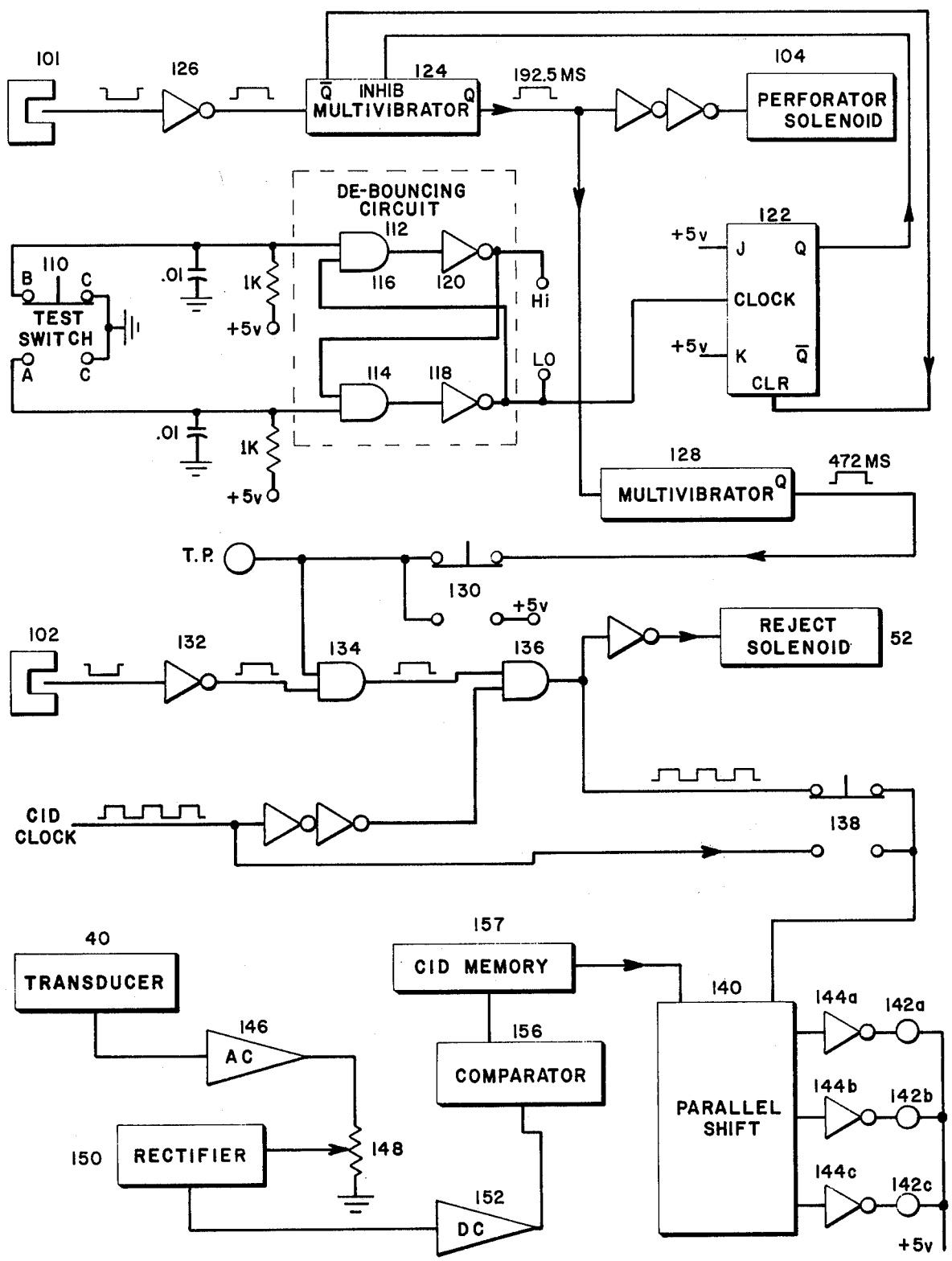
FIG. 5 is a schematic diagram of the calibration control circuit and illustrates the manner in which the actuating mechanism of FIG. 4 is energized.

Referring now to FIG. 5, there is shown a detailed schematic diagram of the calibration control circuit 90, first shown and generally described with respect to FIG. 3. In order to initiate a calibration of the cigarette testing device or apparatus, the operator depresses a test switch 110, thereby closing its contact A to ground, whereby a high input is applied to a debouncing circuit 112 configured in the form of a flip-flop circuit and including first and second AND gates 114 and 116, which in turn are respectively connected to inverters 118 and 120. In response to the high input, the debouncing circuit 112 causes its low output to go high. In turn, the high output is applied therefrom to the clock input of a J-K flip-flop 122, causing its Q output to go low. As shown in FIG. 6, the high Q output of the J-K flip-flop 122 is normally applied to an inhibit input of a multivibrator 124, which illustratively may take the form of a non-retriggerable, monostable, one-shot circuit, thus inhibiting the multivibrator 124. Further, the output of the perforator pick-off 101 is applied via an inverting amplifier 126 to set the multivibrator 124, which with its inhibit signal removed, generates a pulse of a fixed duration, typically in the order of 192.5 milliseconds, to a second multivibrator 128, which may be of a similar type to that of multivibrator 124, and through a pair of inverters to the perforator solenoid 104, which, as shown in FIG. 3, energizes the perforator solenoid 104, whereby the air valve 106 is opened for a sufficient period to cause the air cylinder 60 (see FIG. 5) to rotate the air cylinder lever 51 to engage and actuate the perforator mechanism 57, upon rotation of the test drum 11 into engagement therewith. Thus, in response to the actuation of the test switch 110, the perforation mechanism 57 is actuated and perforations are placed into the first, second, and third test cigarettes.

Figure 6:
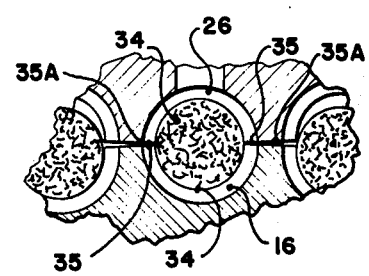
FIG. 6 is an enlarged fragmentary section on the line IV—IV in FIG. 2 and is similar to FIG. 4 of U.S. Pat. No. 3,608,380.

Further, the output of the multivibrator 128 is applied via a reject test switch 130, shown in FIG. 6 in its normal position, to a first input of an AND gate 134. The other input to the AND gate 134 is derived from the output of the reject pick-off 102 as applied through an inverter 132. As explained above, the output of the pick-off 102 indicates a timing signal corresponding to the three perforated cigarettes and causes them to be rejected. In response to the aforedescribed inputs, the AND gate 134 is enabled to apply, in turn, a pulse to a second AND gate 136. The other input to the AND gate 136 is a clock signal corresponding to the passage of each of the flutes 12 of the test drum 11 past a given point and may be taken from the CID clock through a double inverter.

The output of the AND gate 136 is, as shown in FIG. 5, three synchronized clock pulses corresponding to those three flutes 12a, 12b, and 12c (see FIG. 4) receiving the test cigarettes, and are applied via a clear switch 138 to a parallel shift register 140, and also via an inverter to the reject solenoid 52. As seen in FIG. 3, the reject solenoid 52 opens the air valve 108, whereby an air jet is supplied to remove the test cigarettes from the drum 136 (FIG. 1) in a manner as explained above.

Referring still to FIG. 6, the transducer 40 as first shown in FIGS. 2 and 3 provides an input indicative of the sensed air flow through all of the cigarette wrappers, including the test cigarettes, which, as explained, is indicative of the condition of the cigarette wrapper. The transducer output is amplified by an AC operational amplifier 146 and applied to a calibration, sensitivity control taking the form of a potentiometer 148. The tap of the potentiometer 148 is coupled to a rectifier 150 whereby the AC signal is rectified to apply a DC signal whose voltage level is indicative of the air flow through the corresponding cigarette, to a DC operational amplifier 152. In turn, the amplified DC signal is applied to a comparator 156, which compares the DC level to a critical voltage, illustratively set to be 800 mV, to provide a high output if the input DC signal is greater than the critical level and to provide a low signal if the DC signal is below the critical level as determined by the comparator 156. It is noted that the high signal corresponds to unacceptable or "bad" cigarettes, whereas the low signal corresponds to the acceptable or "good" cigarettes. The comparator output is applied to the CID 16 bit shift register, called the CID memory 157. The output from this shift register is applied to the parallel shift register 140. The synchronized clock signal applied to the parallel shift register 140 shifts those stored output signals of the CID memory 157, indicative of whether the test cigarettes are good or bad, to its stages having corresponding outputs associated with each of a plurality of lamps 142a, 142b, and 142c, illustratively taking the form of light-emitting diodes. As shown in FIG. 6, the stage outputs of the parallel shift register 140 are inverted by 144a, 144b, and 144c, before serving to energize their associated lamps.

The reject test switch 130 is incorporated in the circuit of FIG. 5 and, when depressed, places a positive pulse on the AND gate 134 which serves to continually reject cigarettes. Typically, the operator would depress the reject test switch 130 to permit time in which to check the perforator pins 80a, 80b, and 80c. The clear switch 138 is provided to permit the operator to clear the display of lamps 142a, 142b, and 142c by placing a continual clock signal on the parallel shift register 140.

In normal operation, the output of the comparator 156 is applied to a 16 bit shift register (CID memory) 157 and its output as clocked by the output of the CID clock pick-off (not shown) is applied to the reject solenoid 52 to reject those cigarettes that prove to be unacceptable in a manner as described above. However, in accordance with the teachings of this invention, a calibration procedure of the cigarette test apparatus is carried out by first depressing the test switch 110, whereby the perforating apparatus 57 is actuated to cause its perforator pins 80a, 80b, and 80c to perforate the first, second, and third test cigarettes with known perforations. In particular, the first and third test cigarettes disposed within the flutes 12a and 12c are perforated with openings of a diameter of 0.040 inches, whereas the second test cigarette disposed within the flute 12b is perforated with an opening of a diameter of 0.020 inches. Thus, the first and third test cigarettes are perforated with openings that should produce a fault of nonacceptable indication upon the corresponding lamps 142a and 142c, while the opening placed upon the second test cigarette should provide an indication upon the lamp 142b that the cigarette would be acceptable. After perforation, the first, second, and third test cigarettes continue to be rotated by the test drum 11, to the test point at which they are successively tested by the suction transducer 37 and corresponding output signals as derived from the comparator 156 are stored in the parallel shift register 140 to actuate their lamps 142a, 142b, and 142c, as explained above. If the cigarette test apparatus is calibrated correctly, the lamps 142a, 142b, and 142c should respectively be energized, unenergized, and energized, corresponding to an unacceptable, acceptable, and unacceptable test cigarette. At this point, with the operator observing the lamps 142a, 142b, and 142c, he may determine whether the cigarette test apparatus is calibrated correctly because of the known perforations placed in the test cigarettes. If not, the operator can adjust the sensitivity control 148 by adjusting its tap and then reperform the test until the desired display is achieved upon the lamps 142a, 142b, and 142c. In this manner, the operator may readily initiate a calibration of the cigarette test apparatus without interrupting the rapid manufacture of the cigarettes. In one example, this would be very advantageous when a new bobbin of cigarette wrapping paper is installed, in order to prevent the slightly different wrapper paper from causing erroneous readings. In the manner as explained above, the sensitivity control 148 may be adjusted for the slightly varying porosities of the cigarette wrapping paper used in the manufacture of the cigarettes.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. Apparatus for calibrating a device for testing cigarettes, wherein said testing device including conveyor means for moving the cigarette to be tested past a test point and means disposed at said test point for measuring the air pressure difference across the wrapping of the cigarettes to be tested, the improvement comprising:
   a. deforming means disposed adjacent said conveyor means and forward of said test point, for disposing a first and a second defect into first and second test cigarettes, respectively, as carried by said conveyor means, the first and second defects being known, respectively, to provide unacceptable and acceptable pressure differences across the wrappings of the first and second test cigarettes;
   b. manifestation means responsive to the outputs of said pressure means, for indicating, respectively, whether the first and second test cigarettes are acceptable; and
   c. sensitivity means for varying the output of said pressure measuring means until said manifestation means provides indications that the first test cigarette is unacceptable and that the second test cigarette is acceptable.

2. Calibrating apparatus as claimed in claim 1, wherein said deforming means includes means for perforating the first and second cigarettes with openings of known dimensions.

3. Calibrating apparatus as claimed in claim 1, wherein said conveyor means comprises a drum having a plurality of flutes disposed about the periphery thereof for conveying the cigarettes, including the first and second test cigarettes, past said test point, and said deforming means comprising perforating means mounted on said drum and actuatable at a perforating station past said test point.

4. Calibrating apparatus as claimed in claim 3, wherein said perforating means comprises first and second perforator pins rotatably mounted with respect to said drum and to move from a first, non-perforating position to a second, perforating position, and an actuating member for moving said first and second perforating pins from their first to their second position to perforate the first and second test cigarettes, respectively.

5. Calibrating apparatus as claimed in claim 4, wherein said perforating means includes actuating means mounted in stationary fashion with respect to said rotating drum and including an air cylinder lever actuatable to move from a first, non-engaging position to a second, actuating position, whereby as said drum rotates, said actuating member engages said air cylinder lever to cause said first and second pins to move to their second perforating position, at said perforating station.

6. Calibrating apparatus as claimed in claim 1, wherein there is further included storage means for receiving the outputs of said pressure measuring means at first and second points in time corresponding to when said conveyor means moves the first and second test cigarettes past said test point, and timing means responsive to the motion of said conveyor means for providing clock signals whereby the stored outputs of said pressure measuring means are read out and applied to said manifestation means to indicate distinctly the condition of the first and second test cigarettes.

7. Calibrating apparatus as claimed in claim 6, wherein said timing means includes a first pick-off associated with said conveyor means for providing a perforation signal indicative of the passage of each cigarette to be tested past said test point, a second pick-off responsive to the alignment of the first and second test cigarettes with said deforming means to provide a reject signal indicative thereof, and coincidence means responsive to the clock signal and the reject signal of said first and second pick-offs, respectively, to enable the readout from said storage means of the pressure measuring means outputs as stored therein.

8. Calibrating apparatus as claimed in claim 7, further including reject means responsive to the output of said coincidence means for removing the first and second test cigarettes from said conveyor means.

9. Apparatus as claimed in claim 1, further including comparator means responsive to the outputs of said pressure measuring means to provide a first output indicative of whether the test cigarette is unsatisfactory, and a second output indicative of whether the test cigarette is satisfactory.

10. Calibrating apparatus as claimed in claim 9, wherein the output of said pressure measuring means is applied to said sensitivity means and the varied output of said sensitivity means is applied to said comparator means, said comparator means comparing the varied output of said sensitivity means with a fixed signal.

11. Apparatus for calibrating a device for testing cigarettes, said testing device including means disposed at a test point for providing outputs indicative of whether a cigarette is satisfactory or unsatisfactory, the improvement comprising:
a. deforming means for disposing a first and a second defect into first and second test cigarettes, the first and second defects being known, respectively, to provide unacceptable and acceptable cigarettes;
b. manifestation means responsive to the outputs of said testing device for indicating, respectively, whether the first and second test cigarettes are acceptable; and
c. sensitivity means for varying the output of said test device until said manifestation means provides indications that the first test cigarette is unacceptable and the second test cigarette is acceptable.

* * * * *